United States Patent
Wilhelm, II et al.

(10) Patent No.: US 12,457,292 B2
(45) Date of Patent: Oct. 28, 2025

(54) CALL COMPLEXITY COMPUTATION USING IDENTIFIED TOPICS AND TOPIC CHANGES

(71) Applicant: NICE LTD., Ra'anana (IL)

(72) Inventors: Lester Wilhelm, II, Atlanta, GA (US); Jordan Leigh Conrad, Bethlehem, GA (US); Jan-Henrik Saily De La Pena, Atlanta, GA (US)

(73) Assignee: NICE LTD., Ra'anana (IL)

( * ) Notice: Subject to any disclaimer, the term of this patent is extended or adjusted under 35 U.S.C. 154(b) by 317 days.

(21) Appl. No.: 18/458,003

(22) Filed: Aug. 29, 2023

(65) Prior Publication Data

US 2025/0080648 A1 Mar. 6, 2025

(51) Int. Cl.
*H04M 3/436* (2006.01)
*G10L 15/26* (2006.01)
*H04M 3/51* (2006.01)

(52) U.S. Cl.
CPC .......... *H04M 3/4365* (2013.01); *G10L 15/26* (2013.01); *H04M 3/5175* (2013.01)

(58) Field of Classification Search
CPC ......... H04M 3/42136; H04M 3/42221; H04M 3/4365; H04M 3/50; H04M 3/51; H04M 3/5175; G10L 15/26

See application file for complete search history.

(56) References Cited

U.S. PATENT DOCUMENTS

| | | | |
|---|---|---|---|
| 11,228,681 B1* | 1/2022 | Rosenberg | G10L 15/26 |
| 11,356,557 B1* | 6/2022 | Kumar | H04M 3/5175 |
| 11,551,677 B2* | 1/2023 | Roy | H04M 3/5175 |
| 11,991,310 B2* | 5/2024 | Harlin | H04M 3/5175 |
| 2022/0309413 A1* | 9/2022 | Ramachandran | H04M 3/5133 |

\* cited by examiner

*Primary Examiner* — Quochien B Vuong
(74) *Attorney, Agent, or Firm* — Haynes and Boone, LLP

(57) ABSTRACT

An event prioritization system and methods are provided that are configured to dynamically compute call complexity for voice data calls using topics identified from call transcripts. The system includes a processor and a computer readable medium operably coupled thereto, the computer readable medium comprising a plurality of instructions stored in association therewith that are accessible to, and executable by, the processor, to perform call evaluation operations which include receiving a transcript of a voice data call, parsing the transcript for at least one topic, generating, based on the parsing, a list of topics, analyzing, by a call complexity evaluation engine, the list of topics for a complexity rating, determining, based on the complexity rating and a length of the voice data call, a deviation from an expectation, flagging the voice data call, and outputting the flagged voice data call via an interface.

20 Claims, 8 Drawing Sheets

CALL COMPLEXITY COMPUTATION USING IDENTIFIED TOPICS AND TOPIC CHANGES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to voice data call and contact center interaction processing systems, and more specifically to a system and method for analyzing transcripts from voice data calls to calculate call complexity based on call topics and topic changes.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized (or be conventional or well-known) in the prior art. The subject matter in the background section merely represents different approaches, which in and of themselves may also be inventions.

Service providers, such as customer relationship management (CRM) systems, may provide computing services and resources to customer entities and users. These customer entities may correspond to businesses, which, in turn, provide goods or services to consumers and other users. In this regard, customers and consumers have come to expect speed and convenience when interacting with a business, as well as quick and helpful customer service especially during contact center calls and interactions. People now expect companies to understand, anticipate, and address their needs. Quickly solving problems when a customer calls a contact center is important and agents are expected to meet some customers' needs and expectations. To increase customer satisfaction, agents must be trained to provide and deliver fast, comprehensive, and helpful customer service.

In a CRM system that may provide communications with customers, customer service may include agents responding to customers' and other users' issues during voice communications. As such, many companies add value to their business by operating call and contact centers, which allow their customers to receive support for products and services. Contact centers may use a variety of metrics to judge the performance of the center overall and the performance of their individual agents. These metrics may include an average time a support request takes to complete (e.g., an Average Handling Time or AHT), an average time an agent spends completing forms between calls, the results of customer surveys, and other such reviews and metrics.

However, missing from these performance metrics in conventional systems is the complexity of the request during the call. For example, different calls may discuss a different number of topics, and each topic may have their own complexity with some taking less than a minute or a few minutes to resolve, while others may take significant amounts of time and assistance. Thus, while AHT is easily calculated based on the length of calls, there is no equivalent for call complexity. More complex calls require more time for the agent to resolve and may cause more frustration for the customer. Without the ability to measure call complexity, the effects of such complexity on other metrics also may not be visible. Other conventional attempts to measure call complexity may infer such complexity from various pieces of call metadata, however, this is not accurate or sufficient to measure the number and complexity of issues discussed. Thus, there is a need for a solution that derives a single decimal value or rating, which represents the complexity of an interaction between an agent and customer, thereby providing actionable data to contact centers, agents, supervisors, and training systems.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

DETAILED DESCRIPTION

Figure 1:
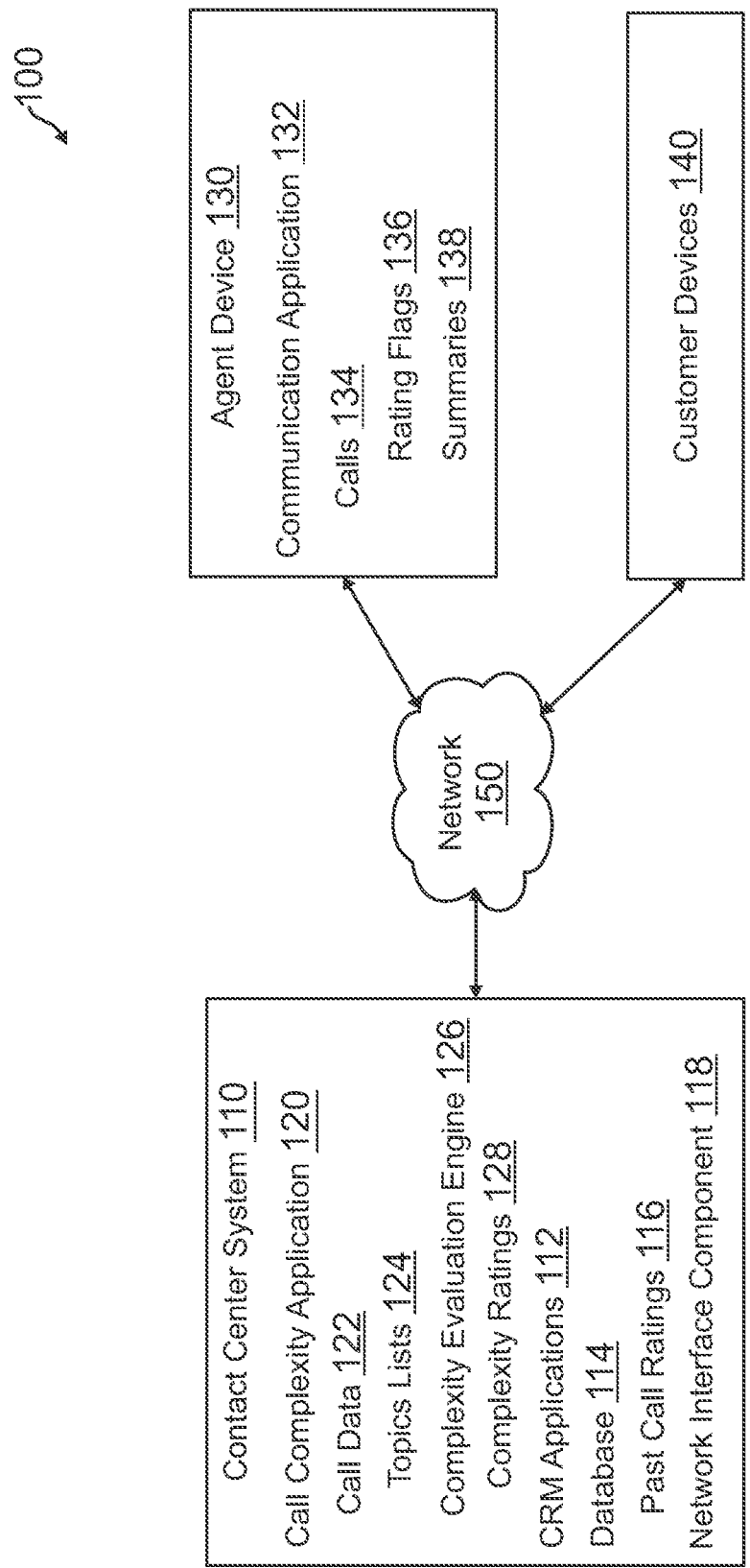
FIG. 1 is a simplified block diagram of a networked environment suitable for implementing the processes described herein according to an embodiment.

This description and the accompanying drawings that illustrate aspects, embodiments, implementations, or applications should not be taken as limiting—the claims define the protected invention. Various mechanical, compositional, structural, electrical, and operational changes may be made without departing from the scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In order to provide for call and chat text transcript processing for computation of call complexity and corresponding scores or ratings, a CRM system of a service provider may process call, event, audio, video, and/or chat data for interactions and communications of users with agents of the CRM system. The CRM system may implement a platform and operations for deriving a single decimal value or similar numerical value that represents the complexity of an interaction through a score or rating. In order to compute the value and rating, an interaction may be represented as a text transcript between two people (e.g., agent and customer), which may be acquired directly from a text chat or derived from an audio source using a speech-to-text engine. Such an engine allows for derivation of complexity using text data converted from the voice and audio content of the interaction. The process for call complexity computation may parse and process the text transcript to generate and determine a list of topics that were covered, discussed, or reviewed during the interaction. The process may then analyze those topics for complexity of the call or other interaction, such as by scoring the number of topics and transitions between topics handled during the interaction. For example, a complexity rating for call complexity may be computed by analyzing the number of times a topic changes in the transcript, as well as how many times a topic occurs within the transcript (e.g., when a topic is revisited or new). Thus, the greater the number of topics and revisiting of one or more topics, the greater the computed call complexity. This allows the automated system for call complexity computation to rate and assess calls and interactions using a value that may be actionable and used in other systems, operations, and agent evaluations. Thus, the system disclosed herein may advantageously allow for proper handling of different calls and interactions in a universally processable and widely understood manner.

As such, the operations may begin with the transcript, which is typically either directly created from a text chat or via a speech-to-text engine processing of an audio file. The transcript may then be passed to a topic generator, which can identify the topics present in the transcript. In general, the list of topics may not be unique to the call or interaction but may contain, in a list form and with timestamps and/or chronological ordering, every topic that occurred in the transcript. As such, the same topic may be covered more than once in a transcript and then identified, which may factor into the complexity score. The complete list of topics may then be sorted into the order in which the topics occurred in the transcript. Where a topic was not identified by the topic identifier engine or process, the lack of change may be considered to be a continuation of the current topic. When initially scoring the call or other interaction using the transcript, the very first topic may be assigned an automatic score of 0 or other base value when there is no previous topic for comparison. Thus, for subsequent topics that the initial topic is compared to, changes in topics may be added to the complexity score and the process may proceed iteratively through the topics in the transcript in order (e.g., based on timestamps and ordering of the list of topics).

If the topic currently being viewed during complexity rating computation is the same as the previous topic in the list, the process for complexity computation may move to the next topic. In this case, the complexity rating may not increase, or may be increased a smaller amount or factor, because the agent and customer are still discussing the same topic. Length of time spent on a single topic may not factor into the complexity rating or may be assigned a separate metric or factor to increase or decrease scores or values assigned to topics that were discussed, depending on the nature of the topic. However, if the topic is different from the previous topic that was discussed, there may be two or more possible values for increasing the call complexity score. First, if the topic has never been previously visited prior to the current location in the transcript and/or list of topics, the process may add a value of 1 or similar to the current complexity value or score of the call or other interaction. If the identified topic has been visited at an earlier location in the transcript, then the process may add a value to the complexity rating for a revisited coefficient that may be assigned to the revisited topic or may multiple the value of that revisited topic (e.g., when a value other than 1) by the revisited coefficient prior to addition of that new value. For example, with a value assigned to a topic of 1, when a topic is revisited, the value added to the complexity rating may be the revisited coefficient (e.g., 1 times a value for the revisited coefficient). However, other values for different topics may be used, in which case that value may be multiplied by the revisited coefficient prior to addition. The process may then add that value to the overall complexity rating.

The embodiments described herein provide methods, computer program products, and computer database systems for a CRM or customer service system that processes and determines a value, score, or rating that may be assigned to voice data calls and other interactions with the CRM system for actionable and processable output data. A service provider system may therefore include a call evaluation system and processor for tenant customers, users, and/or entities that may access different computing services of a service provider and corresponding CRM system. Once call complexity ratings or other values are determined based on transcripts and lists of topics from such transcripts, as described herein, the system and processor may output such ratings for processing by addition components of the CRM system. This may allow the service provider to provide scoring of such calls and interactions for generation of processable data to be handled by further operations and components of the CRM system.

According to some embodiments, in a CRM and customer service system accessible by a plurality of separate and distinct organizations, systems, algorithms, features, and models are provided for identifying, predicting, classifying, and computing scores or values for call complexity from transcripts of voice data calls and other interactions, thereby providing more precise and universally processable assessments of interactions with contact centers.

EXAMPLE ENVIRONMENT

The system and methods of the present disclosure can include, incorporate, or operate in conjunction with or in the environment of a CRM, customer service, and contact center data processing engine and computing system, which may be utilized to determine call complexities and corresponding scores or ratings for voice data calls, chats, and other voice, text, video, and similar communications between two users, such as an agent and a customer. FIG. 1 is a block diagram of a networked environment 100 suitable for implementing the processes described herein according to an embodiment.

As shown, environment 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or fewer number of devices and/or servers. For example, machine learning (ML), neural network (NN), and other AI architectures have been developed to improve predictive analysis and classifications by systems in a manner similar to human decision-making, which increases efficiency and speed in performing predictive analysis. Further, cloud-based architectures have been developed to improve collaboration, integration, and community-based cooperation between users without sacrificing data security. Such intelligent and/or cloud-based systems may be implemented and/or utilized by the computing systems and architectures discussed herein to provide call complexity evaluation and computation for CRM and contact center systems. One or more devices and/or servers providing and utilizing these computing services may be operated and/or maintained by the same or different entities.

FIG. 1 illustrates a block diagram of an example environment 100 according to some embodiments. Environment 100 includes a contact center system 110, an agent device 130, and customer devices 140 that interact to provide call complexity score or rating computation and utilization for agent and customer outreach and proactive training and resolution, as discussed herein. In other embodiments, environment 100 may not have all of the components listed and/or may have other elements instead of, or in addition to, those listed above. In some embodiments, the environment 100 is an environment in which voice call, text, and other communication data processing may be performed through an engine, processor, and system, such as one that utilizes intelligent transcript processing based on covered and discussed topics in communication transcripts. As illustrated in FIG. 1, contact center system 110 might interact via a network 150 with agent device 130 and customer devices 140 to compute, provide, and output call complexities and other scores or ratings based on transcripts from communications between two or more users.

Environment 100 of FIG. 1 includes a representation of the call complexity computation system and modules for computing scores or ratings for call complexities, which includes use of call complexities in further agent and customer interactions and outreach, such as for issue resolution, training, and the like. In environment 100, contact center system 110 includes a call complexity application 120 configured to process communications, including calls, chats, videos, and the like from call data 122. Call data 122 may include audio, text, and other communication data from one or more voice data calls, online chats, video calls or conferences, or other communications between two or more users that was monitored, recorded, and/or stored from a communication channel. Such communications may be initiated by an agent or customer for resolution of an issue, such as a help request, assistance outreach, inquiry, and the like that a customer may request from a company that employs the agent. Agent device 130 may include communication application 132, which may correspond to a software application and corresponding components, application programming interfaces (APIs), and the like that assist an agent or other employee of an entity (e.g., business, organization, etc.) in providing CRM systems, contact center call services, and communication assistance. Customer devices 140 may interact with contact center system 110 and/or agent device 130 during the course of business, such as to request CRM services, assistance, and the like through contact centers, online chats, and other communication channels.

Contact center system 110 may provide a user interface (e.g., through CRM applications 112 of contact center system 110 and/or communication application 132) for users to communicate, via customer devices 140, with an agent using agent device 130, which may result in corresponding call data 122 for a voice call or the like (e.g., chat logs, videos, etc.). For example, communication application 132 may be used to perform calls 134 with customer device 140, which may generate call data 122. As such, call complexity application 120 may include operations and an API to access and retrieve call data 122 from CRM applications 112 for calls 134, which may pull data from CRM applications 112 for newly reported issues and other communications. Call data 122 may include or may be processed to generate and provide transcripts of calls 134 and other communications, which may correspond to a text data log or file of the corresponding communications between the customer(s) and agent(s).

For example, voice data calls and video chats may be processed and text data for a transcript extracted using a voice/speech-to-text engine, model, and/or operations, whereas text data may be determined using a log of an online chat or communication. Once available, the transcripts may be parsed to determine topics lists 124, which correspond to ordered lists of individual topics covered and/or discussed during the calls or communications. Topics may be individually identified using keywords, phrases, sentences, and the like, but may also or instead be labeled, such as using designations by agents or reviewers, ML models and NNs, and the like. Such ordered lists may include timestamps for topics in the list that orders the topics in a consecutive and chronological manner. In some embodiments, the timestamps may be used to determine a length of time each topic is discussed.

A scheduler of call complexity application 120 may be used with topics lists 124 to schedule processing and scoring/rating for call complexity using a complexity evaluation engine 126. Complexity evaluation engine 126 may execute a processing operation or job to process transcripts based on topics lists 124 and compute or calculate call complexities as a numeric rating or score that identifies a complexity of the corresponding communication. In this regard, for a transcript and corresponding one of topics lists 124 for that transcript, complexity evaluation engine 126 may sequentially proceed with processing through the topics in their order in the list to identify an original topic, each change to a new topic, and whether the topic is a new topic or a revisited topic in the list and corresponding transcript in order to compute complexity ratings 128. Complexity evaluation engine 126 may start with an initial score of zero (0) for the first topic and add one (1) for each new topic discussed and found in the corresponding one of topics lists 124 for the transcript. Where a topic is revisited, a revisited coefficient may be applied to increase or decrease the weighted value of that topic to a corresponding one of complexity ratings 128 of the communication, or the corresponding one of complexity ratings 128 may not be increased and the revisited topic may be ignored. Once computed, complexity ratings 128 may be stored and used with past call ratings 116 for further use with call and communication analysis and agent review.

Complexity evaluation engine 126 may perform such processing of the topics in sequential, consecutive, and/or chronological order to compute complexity ratings 128 from topics lists 124. Once determined, complexity rating 128 may be associated with corresponding calls or other communications, such as by attaching the ratings as metadata, tags, or the like to such communication files. Further, the communications, such as calls 134, may be flagged in a CRM system and/or interface provided by CRM applications 112 for review. Flagging may occur when one or more of complexity ratings 128 meet or exceed a threshold score or rating to identify the corresponding communication as a complexity outlier or significant communication requiring review. In this regard, calls 134 may be displayed for review via communication application 132, which may include rating flags 136 that score or rate each call by complexity.

With rating flags 136, summaries 138 may be provided, which summarize the transcript, topics, and/or reason or explanation for the computed call complexity. For example, summaries 138 may identify each topic and change of topic, along with the weighted rating for each topic and/or change in the score. Summaries 138 may also identify why different calls meet or exceed a threshold or average rating for calls of similar length and/or topic numerosity, as well as what caused the rating for the corresponding call (e.g., revisiting topics, too many or few topics for a length of time, etc.). Such comparisons and evaluations for summaries 138 may further be based on historical data, such as past call ratings 116 stored by a database 114 of contact center system 110. Complexity ratings 128 may also be used to identify communications requiring customer outreach, such as those that are very complex and may require further follow-up to ensure issue resolution. Additionally, complexity ratings 128 may be used to flag and identify agents and communications for training opportunities. Such operations and components for computation and use of complexity ratings 128 and other scores or evaluations of call and communication complexity are discussed in further detail with regard to FIGS. 2-5 herein.

In some embodiments, one or more ML models, NNs, or other AI-based models and/or engines may be trained to perform topic extraction and identification in transcripts. For example, when training, past training data may be used, which may be associated with past topics and their corresponding words, phrases, sentences, and other information that may signify such topic was discussed between users. The training data may be labeled or unlabeled for different supervised or unsupervised ML and NN training algorithms, techniques, and/or systems. Contact center system 110 may further use features from such data for training, where the system may perform feature engineering and/or selection of features associated with the features used for training and decision-making using one or more ML, NN, or other AI algorithms, operations, or the like (e.g., including configuring decision trees, weights, activation functions, input/hidden/output layers, and the like). After initial training, models and engines may be deployed in a production computing environment to receive inquires and data for features and predict labels or other classifiers from the data (e.g., topic identification from transcripts). Features and other transcript data may be represented as vectors, as well as corresponding outputs for classification, ranking, and/or comparison during topic identification. This may allow for representation of data as n-dimensional vectors and/or matrices, as well as calculation of such vectors or other data representations from matrices. A NN or other ML-based model may then be trained using a function and/or algorithm for the model trainer, as well as other AI systems, trainers, and operations for model and/or engine training and development. The training may include adjustment of weights, activation functions, node values, and the like.

One or more client devices and/or servers (e.g., agent device 130 and/or customer devices 140) may execute a web-based client that accesses a web-based application provided by contact center system 110, or may utilize a rich client, such as a dedicated resident application, to access contact center system 110. Computing services of contact center system 110 may be provided by CRM applications 112 and/or other computing services, platforms, interfaces, and data processing operations to agent device 130 and/or customer devices 140. Customer devices 140 may utilize one or more application programming interfaces (APIs) to access and interface with CRM applications 112 and/or communication application 132 in order to engage in computing services, as discussed herein. Interfacing with contact center system 110 and/or agent device 130 may be provided through an application for CRM applications 112 and/or communication application 132 and may be based on data stored by database 114 of contact center system 110, provided by agent device 130, and/or provided by customer devices 140. Customer devices 140 might communicate with contact center system 110 and/or agent device 130 using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. Communication between contact center system 110, agent device 130, and/or customer devices 140 may occur over network 150 using a network interface component and/or other network connection of the client devices and network interface component 118 of contact center system 110. In an example where HTTP/HTTPS is used, the client devices might include an HTTP/HTTPS client commonly referred to as a "browser" for sending and receiving HTTP//HTTPS messages to and from an HTTP//HTTPS server, such as contact center system 110 via network interface component 118.

Contact center system 110 may host an online platform accessible over network 150 that communicates information to and receives information from agent device 130 and/or customer devices 140. Such an HTTP/HTTPS server might be implemented as the sole network interface between agent device 130 or customer devices 140 and contact center system 110, but other techniques might be used as well or instead. In some implementations, the interface between agent device 130 or customer devices 140 and contact center system 110 includes load sharing functionality. As discussed above, embodiments are suitable for use with the Internet, which refers to a specific global internet of networks. However, it should be understood that other networks can be used instead of or in addition to the Internet, such as an intranet, an extranet, a virtual private network (VPN), a non-TCP/IP based network, any LAN or WAN, or the like.

The devices, servers, and/or components in environment 100 may utilize network 150 to communicate, such as between with contact center system 110, agent device 130, and/or customer devices 140, which is any network or combination of networks of devices that communicate with one another. For example, network 150 can be any one or any combination of a local area network (LAN), wide area network (WAN), telephone network, wireless network, point-to-point network, star network, token ring network, hub network, or other appropriate configuration. The most common type of computer network in current use is a transfer control protocol and Internet protocol (TCP/IP) network, such as the global inter-network of networks often referred to as the Internet. However, it should be understood that the networks that the present embodiments might use are not so limited, although TCP/IP is a frequently implemented protocol. Further, one or more of contact center system 110, agent device 130, and/or customer devices 140 may be included by the same system, server, and/or device and therefore communicate directly or over an internal network.

According to one embodiment, contact center system 110 and/or agent device 130 is/are configured to provide webpages, forms, applications, data, and content to one or more client devices (e.g., customer devices 140 or the like) and/or to receive data from the client device(s). In some embodiments, contact center system 110 and/or agent device 130 may be provided or implemented in a cloud environment, which may be accessible through one or more APIs with or without a correspond graphical user interface (GUI) output. Contact center system 110 and/or agent device 130 further provides security mechanisms to keep data secure. Additionally, the term "server" is meant to include a computer system, including processing hardware and process space(s), and an associated storage system and database application (e.g., object-oriented data base management system (OODBMS) or relational database management system (RDBMS)). It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

In some embodiments, contact center system 110, agent device 130, and customer devices 140, shown in FIG. 1, execute processing logic with processing components to provide data used for CRM applications 112, communication application 132, and the like and/or utilize CRM applications 112, communication application 132 and the like of contact center system 110. In some embodiments, this may include performing communications associated with call data 122 and/or calls 134, as discussed herein, as well as engaging in customer service through CRM applications 112. In one embodiment, contact center system 110, agent device 130, and/or customer devices 140 include application servers configured to implement and execute software applications, as well as provide related data, code, forms, webpages, platform components or restrictions, and other information. Contact center system 110 may implement various functions of processing logic and processing components, and the processing space for executing system processes, such as running applications for CRM applications and call complexity computation. Contact center system 110, agent device 130, and customer devices 140 may be accessible over network 150. Thus, contact center system 110 may send and receive data to one or more of agent device 130 and customer devices 140 via network interface component 118. Agent device 130 and customer devices 140 may be provided by one or more cloud processing platforms, such as Amazon Web Services® (AWS) Cloud Computing Services, Google Cloud Platform®, Microsoft Azure® Cloud Platform, and the like, or may correspond to computing infrastructure of an entity, such as a financial institution.

The system shown and described in FIG. 1 includes elements that are explained briefly here. For example, customer devices 140 may include a desktop personal computer, workstation, laptop, notepad computer, PDA, cell phone, or any wireless access protocol (WAP) enabled device or any other computing device capable of interfacing directly or indirectly to the Internet or other network connection. Customer devices 140 may also be a server or other online processing entity that provides functionalities and processing to other client devices or programs, such as online processing entities that provide services to a plurality of disparate clients.

Customer devices 140 may run an HTTP/HTTPS client, e.g., a browsing program, such as Microsoft's Internet Explorer or Edge browser, Mozilla's Firefox browser, Opera's browser, or a WAP-enabled browser in the case of a cell phone, tablet, notepad computer, PDA or other wireless device, or the like. According to one embodiment, customer devices 140 and all of the components thereof are configurable using applications, such as a browser, including computer code run using a central processing unit such as an Intel Pentium® processor or the like. However, customer devices 140 may instead correspond to a server configured to communicate with one or more client programs or devices, similar to a server corresponding to contact center system 110 that provides one or more APIs for interaction with the client devices.

Contact center system 110, agent device 130, and/or customer devices 140 (as well as any client devices) and all of their components might be operator configurable using application(s) including computer code to run using a central processing unit, which may include an Intel Pentium® processor or the like, and/or multiple processor units. A server or device for contact center system 110, agent device 130, and/or customer devices 140 may correspond to Window®, Linux®, macOS®, or the like operating system server that provides resources accessible from the server and may communicate with one or more separate user or client devices over a network. Exemplary types of servers may provide resources and handling for business applications and the like. In some embodiments, the server may also correspond to a cloud computing architecture where resources are spread over a large group of real and/or virtual systems. A computer program product embodiment includes a machine-readable storage medium (media) having instructions stored thereon/in which can be used to program a computer to perform any of the processes of the embodiments described herein utilizing one or more computing devices or servers.

Computer code for operating and configuring contact center system 110, agent device 130, and customer devices 140 to intercommunicate and to process webpages, applications and other data and media content as described herein are preferably downloaded and stored on a hard disk, but the entire program code, or portions thereof, may also be stored in any other volatile or non-volatile memory medium or device, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

Call Complexity Computation

Figure 2:
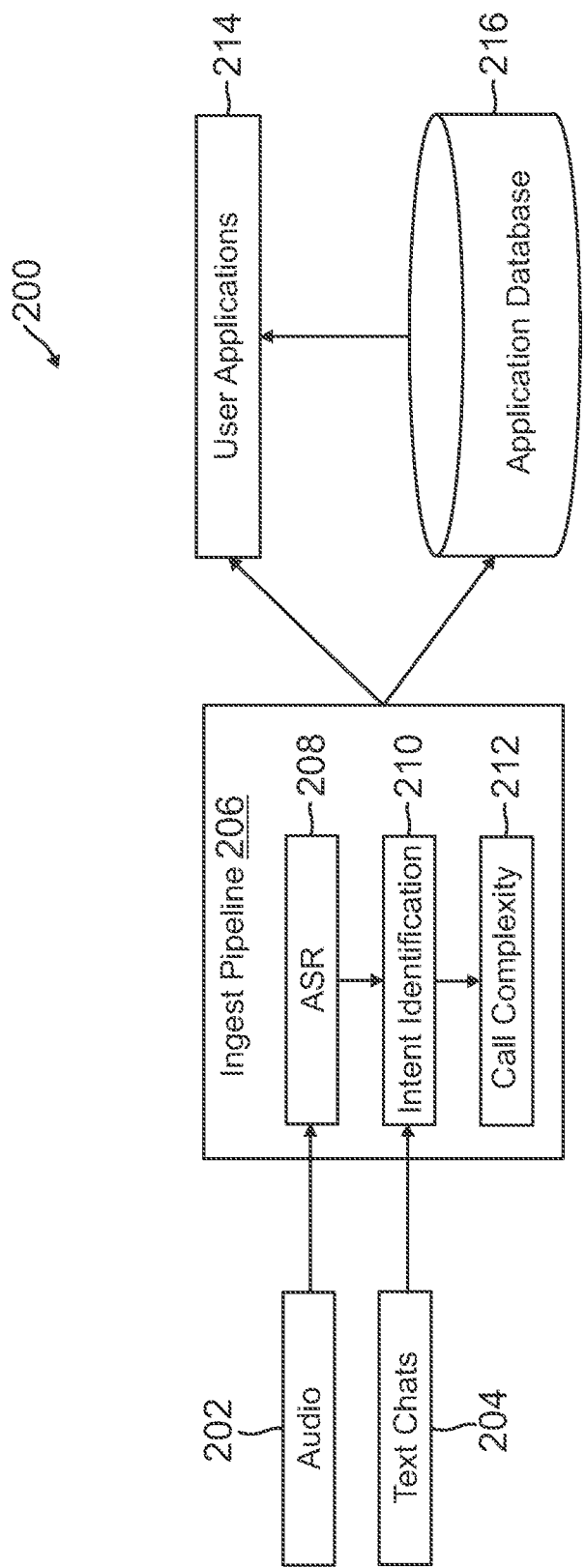
FIG. 2 is a simplified system environment for processing incoming calls, other audio data, and text chats to provide scored call complexities based on topics in transcripts according to some embodiments.

FIG. 2 is a simplified system environment 200 for processing incoming calls, other audio data, and text chats to provide scored call complexities based on topics in transcripts according to some embodiments. System environment 200 shows a system for processing voice data calls, transcripts, and/or other recordings and logs from communications to determine call or communication complexity based on topics discussed during such communication sessions, such as computing issues that may affect computing systems, software, or architecture of a customer business or organization. In this regard, system environment 200 displays components that may be used for these operations, such as those used by call complexity application 120 of contact center system 110 from environment 100 of FIG. 1.

A client device, customer, business, organization, or the like may correspond to a user that may utilize computing resources, applications, and solutions provided by a service provider. The service provider may provide and/or utilize CRM systems for customer service that assists in resolving issues faced by customers. In system environment 200 for received communications corresponding to audio 202 (e.g., phone calls, audio from video chats or conferences, VOIP/VOLTE sessions, and other voice chats) and text chats 204 (e.g., from live or bot chat sessions using a web or application chat feature or the like), an ingest pipeline 206 is shown for a CRM and/or customer service system or computing architecture, which may be implemented and/or executed to provide customer service and call complexity computation. Data for ingest pipeline 206, including audio 202 and text chats 204, may include data from CRM integrations and applications, external communication systems, an API or user interface to capture and assist with communications between users, and the like. These may include an API and/or API integration to detection, receive, and/or pull data from CRM applications 112 for communications (e.g., using HTTP requests with GET commands) in order to record, obtain, and process audio 202 and text chats 204.

On receipt of audio 202, ingest pipeline 206 may utilize an automatic speech recognition (ASR) 208 to perform a speech-to-text processing of audio 202 and generate a transcript of text from different audio data. ASR 208 may therefore convert audio data into a text format that is readable and processable by an AI engine, such as an ML model or NN, for topic determination by an intent identification 210, such as an engine for identifying intents, and therefore topics, in text data. Text chats 204 may be in text form, and therefore may be processible by intent identification 210. Thus, the transcripts from audio 202 and text chats 204 may be processed by intent identification 210 to generate a list of topics from the corresponding text data and chat between the parties in the communication.

Thereafter, call complexity 212 may take the lists of topics from different voice data calls and/or communications for audio 202 and text chats 204, and may perform a call complexity computation and calculation for a score or rating that quantifies a complexity of a given communication or interactions based on the list of topics, topic changes in the list, and new or revisited topics in the list. Thus, the transcript may be either directly created from text chats 204 or via a speech-to-text engine processing audio 202, and the topic generator of intent identification 210 may identify the topics present in the transcript for processing. A list of topics may contain each topic that occurred in the transcript in order in which the topic was discussed and occurs in the transcript. The same topic may occur more than once in a transcript, which may factor into the complexity score as discussed herein.

After intent identification 210 utilizes a transcript to generate a list of topics from a given agent/customer interaction, call complexity 212 then analyzes topics for a complexity rating. The complexity rating may be determined by analyzing the number of times a topic changes, as well as how many times a single topic occurs within the transcript. As such, the greater the number of topics, the greater the call complexity, with revisiting topics adding additional weighted values to the output rating. Call complexity 212 may therefore compute and calculate a complexity rating based on the transcript, which may then be utilized with user applications 214, such as CRM applications 112 and/or communication application 132, to flag calls based on complexity ratings and provide the ratings and summaries to one or more users (e.g., customers, agents, supervisors, etc.). An application database 216 may also store complexity ratings with calls and communications, for example, as metadata or other data for a data file or object, which may then later be processed and provided in user applications 214. As such, application database 216 may be referenced and used during agent training and/or review with user applications 214. The operations for complexity rating computation for call complexity are shown in further detail with regard to FIG. 3A below.

Figure 3A:
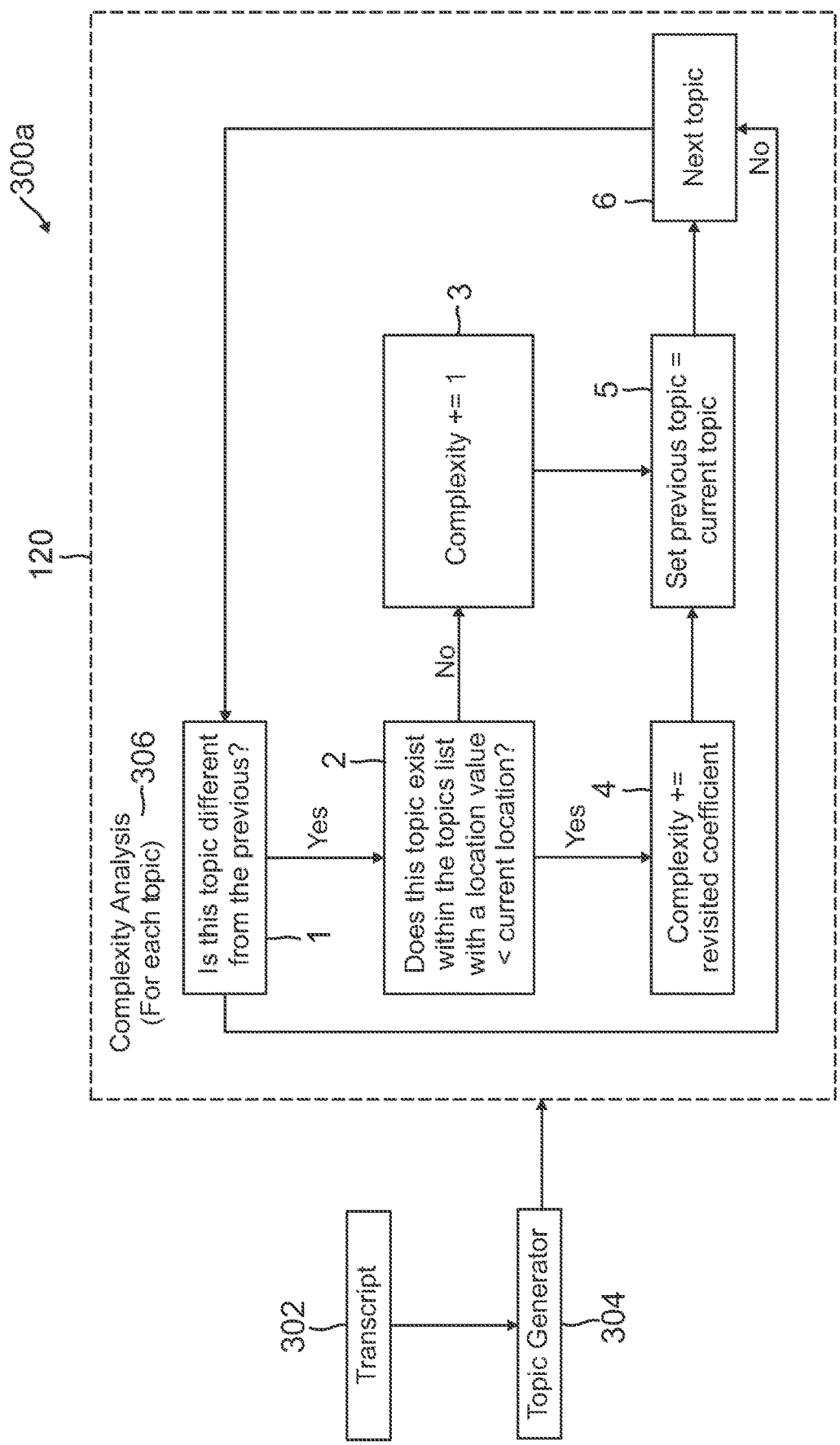
FIGS. 3A-3C are simplified diagrams for different operations to determine call complexities and utilize call complexities with contact center operations and agents according to some embodiments.
Figure 3B:
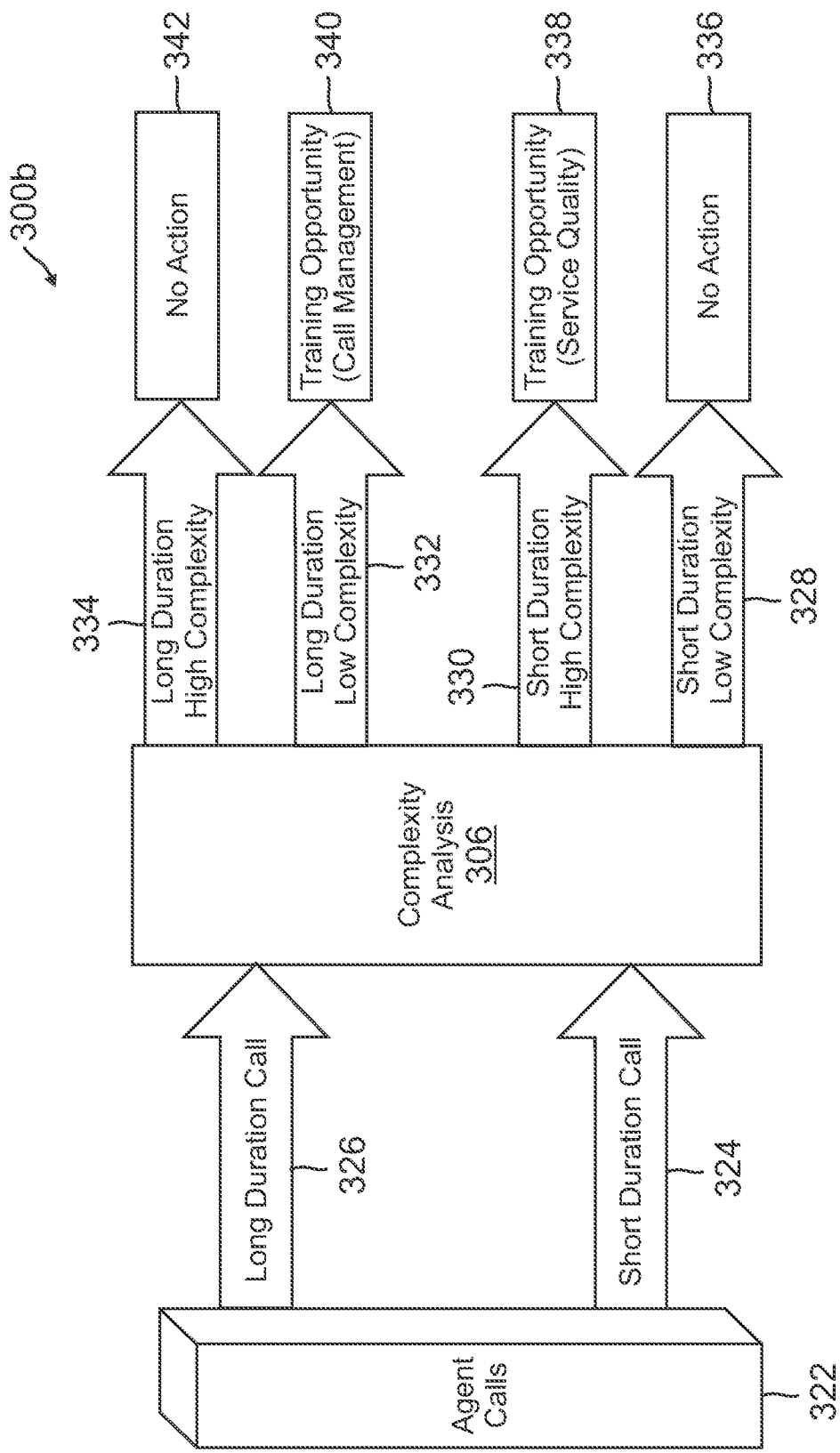
Figure 3C:
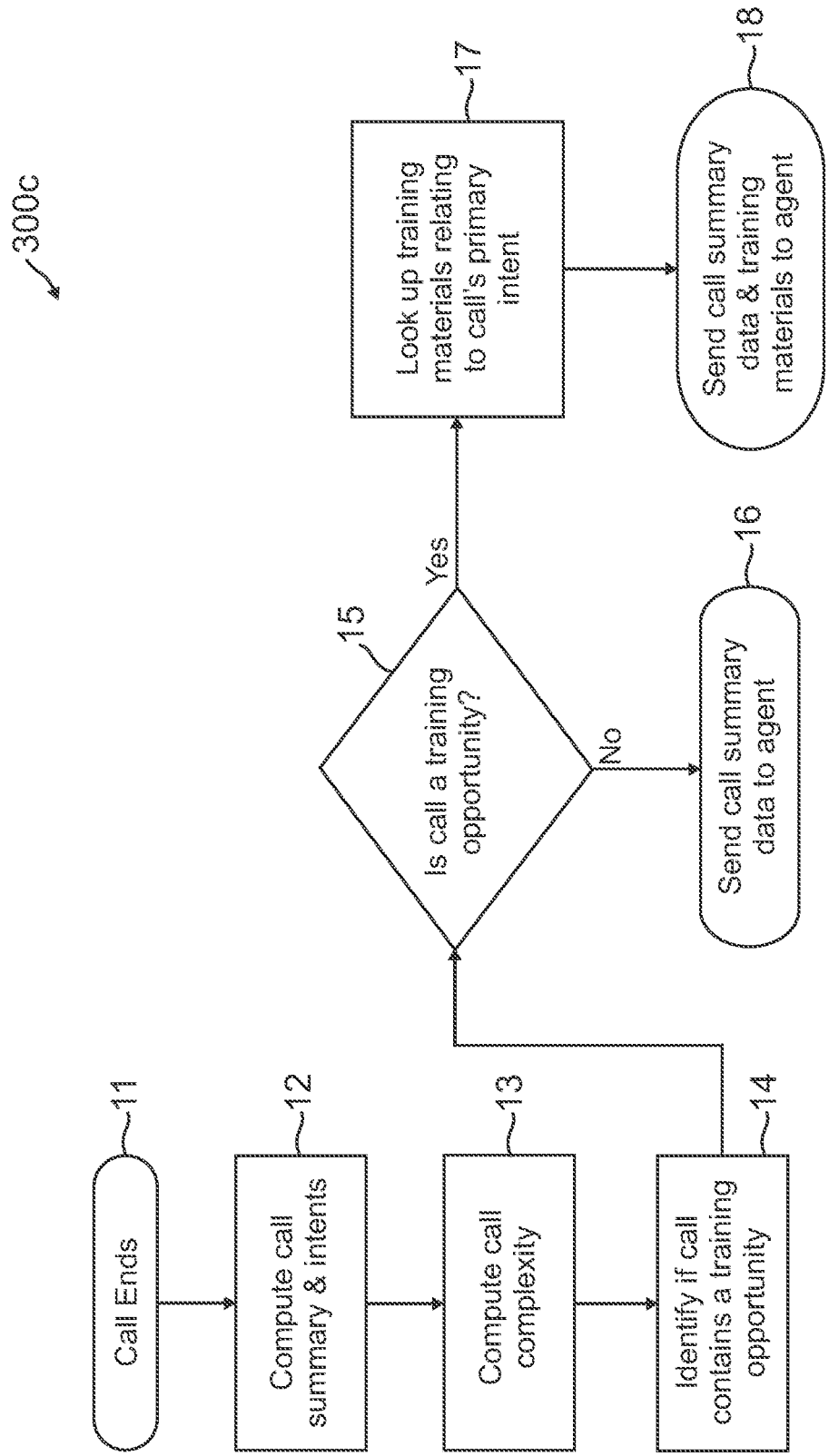

FIGS. 3A-3C are simplified diagrams 300a-300c for different operations to determine call complexities and utilize call complexities with contact center operations and agents according to some embodiments. In this regard, diagrams 300a-300c show different operations performed by call complexity 212 for complexity rating computation, which may correspond to those components and modules of call complexity application 120 of contact center system 110 from environment 100 of FIG. 1. For example, diagram 300a displays a more detailed environment where customer service calls and assistance may be processed for complexity ratings by call complexity 212.

In diagram 300a, transcript 302 is fed to topic generator 304, and then processed, such as by call complexity 212 in system environment 200 of FIG. 2. The list of topics may be sorted in the order in which they occurred in the transcript and areas where a topic was not identified may be ignored using an assumption that such areas are a continuation of the previous topic. Call complexity 212 may perform complexity analysis 306, which may start with the first topic and an assigned score of 0 and move to the next topic sequentially in the order in which the topics appear in the list of topics and transcript (e.g., chronologically). Thus, at step 1, if the topic being currently viewed is the same as the previous topic in the list, call complexity continues by moving to the next topic at step 6. Thus, in such examples, step 1 proceeds to step 6 for complexity analysis 306 when the topic remains the same, where step 6 advances to a next topic and reverts back to step 1 for this next topic. In this case the complexity rating is not increased because the agent and customer are still discussing the same topic. As such, in complexity analysis 306, the length of time spent on a single topic does not factor into the complexity rating, however, other systems may account for the length of time and/or provide a weighted coefficient, value, or rating to such length.

If at step 1 the topic is different from the previous topic, there may be two possible values for increasing the call complexity rating. At step 2, it is determined whether the topic exists within the list of topics with a location value that is less than the current location (e.g., if the topic has been previously seen and processed for the complexity rating and therefore whether this is a revisited topic (previously seen) or new topic (unseen)). At step 2, if the topic has never been visited prior to the current location, complexity analysis 306, at step 3, may add 1 to the current complexity rating (e.g., 0 for only 1 original topic visited, so the first new topic from the original would result in a complexity rating of 1). In some embodiments, other initial scores and values for next new topics may be used based on a varying values assigned per topic. If at step 2, the identified topic has been visited at an earlier location in the transcript, then complexity analysis 306, at step 4, may multiply the topic change value or rating (of 1, in this iteration) by a revisited coefficient (e.g., some value or coefficient that increases or decreases the topic's value), which may then be added to the complexity rating. Further, steps 3 and 4 may proceed to step 5 where the previous topic is now set as equal to the current topic for purposes of the complexity rating computation, and then proceed to step 6 where a next topic is analyzed.

As such, for the very first topic, an automatic score of 0 may be created for lack of a previous topic for comparison, and subsequent topics may be compared to the previously identified topic to add to the complexity score. In either case, once the complexity rating has been updated, complexity analysis 306 may move to the next topic. Where the topic is revisited, a revisited coefficient may be used. The revisited coefficient may correspond to a value used to penalize, reward, or adjust call complexity for revisited topics so that a value added by revisiting a topic causes the call complexity to increase by a smaller or greater amount than when a new topic is visited during complexity analysis 306. For example, in some interactions, returning to a topic may make the interaction more complicated because information about a single topic may then be spread across multiple points in time. To represent this added complexity, a revisited coefficient greater than 1 may be used to increase the value added to the complexity rating and penalize revisited topics in this manner for the added complexity. However, in other cases, returning to a topic might not add significant complexity, and therefore a revisited coefficient of 1 or less may be used to represent that revisiting of a topic does not add complexity or may decrease the complexity of the topic when revisited (e.g., since the agent may have prior knowledge associated with the topic, less value may be added as the topic discussion may be shorter and/or less complicated).

In diagrams 300b and 300c, operations are shown for processing voice data calls and other communications for training opportunities based on call complexity. For example, call complexity and complexity ratings may be useful when used with other metrics, including call duration and/or customer survey results. Normally, it may be expected that complex calls take longer than less complex calls to successfully complete. As such, it may be expected that an agent has a shorter average call time for less complex calls. This agent may then increase their average call time proportionally to call complexity. As such, agents and calls that deviate from this expectation may be possible targets for additional training. In determining how to flag interactions for training opportunities, the calculation may analyze the average duration compared to the average complexity.

With regard to diagram 300b, agent calls 322 are processed to identify short duration calls 324 and long duration calls 326. With short duration calls 324 and long duration calls 326, complexity analysis 306 may further be applied to add complexity ratings to call lengths, which may then be used for training opportunities. Calls shorter than the average duration and of lower complexity than the average may be considered short duration and low complexity 328, where no action 336 may be taken as such calls are not necessarily the targets of additional training since they are quickly resolved for few issues or topics. Similarly, with a longer than average duration and higher than average complexity, the call may be considered long duration and high complexity 334. No action 342 may also be taken for calls designated as long duration and high complexity 334 since it may be considered normal or acceptable for contact center and agent handling for long calls when complexity is high. The tenant, entity, or user performing the call complexity analysis may define an acceptable deviation from the average if desired. For example, with an average duration of 945000 ms (about 16 minutes) and an average complexity of 22, a duration of 950000 ms and a complexity of 20 would be considered long and simple (e.g., a deviation of 5000 ms and 2 complexity), and the call may be flagged. Such deviation may be numerical, or an acceptable deviation may be percentage, such as 10%. Where no deviation from average is found and/or short duration and low complexity 328 or long duration and high complexity 334 is found, no action may be needed.

However, calls with shorter duration than average and a higher complexity than average may be designated as short duration and high complexity 330. For such calls, a training opportunity 338 may be targeted as service quality may be impacted from the agent quickly resolving multiple topics and issues with high complexity to the call. The agent may not have properly addressed all topics or may have spoken more brusquely than desired, for example, and as such may be targeted for training and/or service analysis to ensure proper service quality. Calls longer than the average duration and having a complexity lower than the average may be considered long duration and low complexity 332. Such calls may also be designated for a training opportunity 340 for other reasons, such as proper call management, time and efficiency handling, and the like. For training opportunity 340, an agent may be provided with materials to more quickly and/or efficiently handle calls, route calls to proper resources and/or endpoints, and the like, which may include assistance with materials, customer handling, and other assistance.

In diagram 300c, training may be identified and provided to agents based on complexity analysis 306. For example, since training opportunities 338 and/or 340 may also be computed and used in a real-time or near-real-time setting after calls occur, the training opportunity data may be used to direct agents to training materials automatically without the need for a manual evaluator and/or intervention after a call. At step 11, an agent's call ends, and the call's transcript is processed. At step 12, the call summary and intents are computed from the transcript, such as using ASR or other text data from the call. At step 13, call complexity is computed, such as a complexity rating for the call from topics discussed during the call and their changes or transitions with revisited coefficients applied for revisited topics. At step 14, if the call contains a training opportunity, such as training opportunities 338 and/or 340, those training opportunities may be identified. Steps 11-14 are discussed above with regard to diagrams 300*a* and 300*b* of FIGS. 3A and 3B.

If at step 15 it is determined that the call is not a training opportunity, such as training opportunities 338 and/or 340, at step 16 a call summary is sent to the agent, which may include the complexity rating. The agent's calls may also be scanned by a real-time interaction guidance system, which may use training opportunities 338 and/or 340 to identify training and/or assistance materials during a call and/or after the call ends in real-time or near real-time. For example, if, at step 15, it is determined that the call is a training opportunity, at step 17, training materials may be looked up and retrieved based on the call's primary intent, such as based on the topics in the list of topics for the call and transcript. After a call ends and it is flagged as training opportunities 338 or 340, the primary intent data obtained from the real-time ASR results (e.g., the transcript) may be used to identify relevant training materials for the agent and have those materials automatically sent to the agent's desktop. Thus, at step 18, the call summary data and training materials may be sent to the agent, which may then be used for training opportunities 338 and/or 340.

Figure 4:
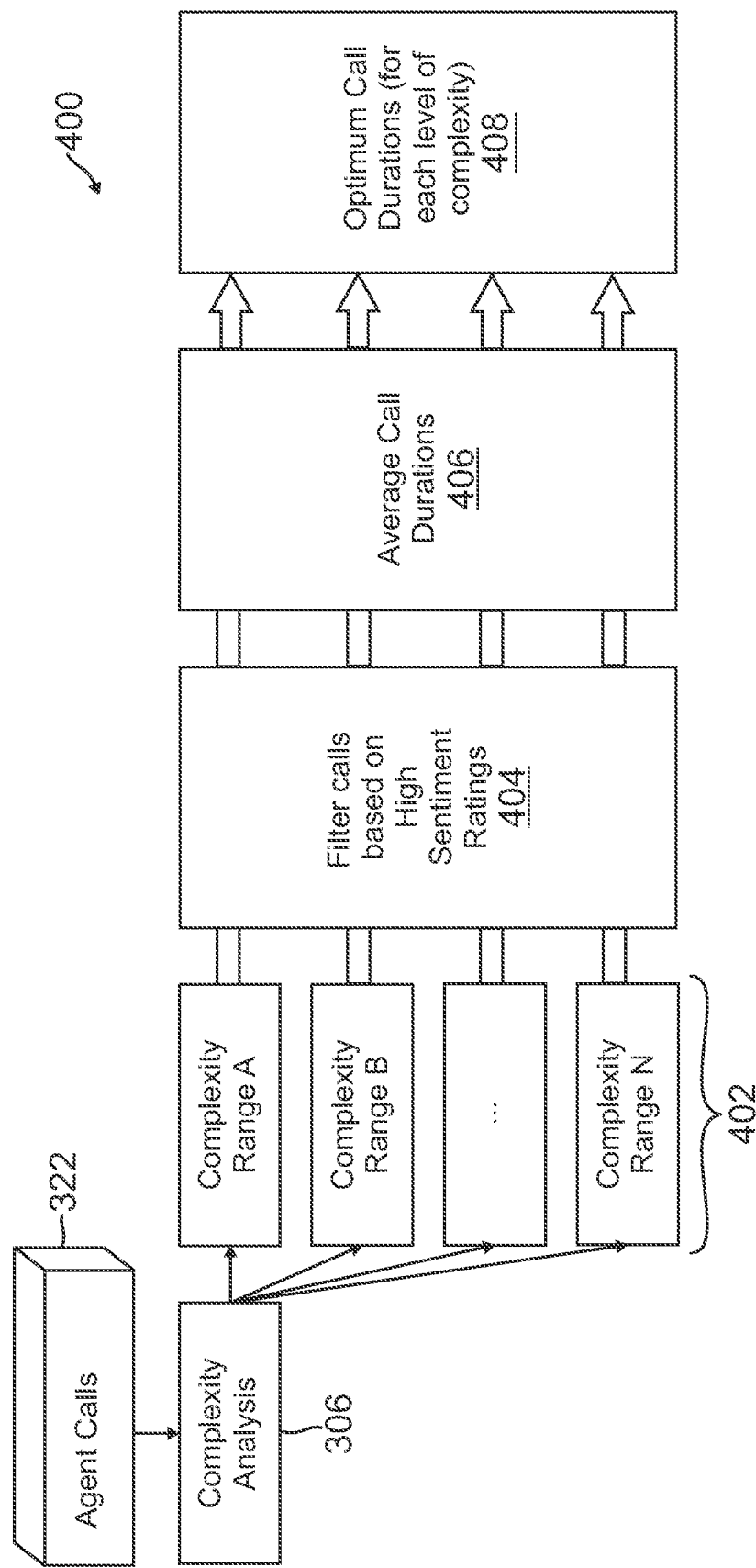
FIG. 4 is a simplified diagram of optimum call durations determined from call complexity computation using identified topics and topic changes according to some embodiments.

FIG. 4 is a simplified diagram 400 of optimum call durations determined from call complexity computation using identified topics and topic changes according to some embodiments. In this regard, diagram 400 represents operations for determining an optimal call duration for each level of call complexity, which may be performed by components and modules of call complexity application 120 of contact center system 110 from environment 100 of FIG. 1. For example, calculation of call complexity may occur as soon as a topic list is generated from a transcript, which may be a part of a post-call processing and messaging to customers and agents, as discussed herein.

In the previous examples, each topic after the first (as well as the first, in corresponding embodiments) have been assigned a base complexity of 1. However, if enough topic metadata is available, topics may be provided a different base complexity, which may be added or adjusted to call complexity when a topic transition occurs. This base complexity is also multiplied by the revisited coefficient when it reoccurs. The assignment of base complexity for different topics may be useful if the topics provided by the topic generator vary in inherent complexity. For example, a topic labeled "transfer account owner" may be more complicated, and therefore require more time, assistance, work, etc., than one labeled "update address." As such, the addition of base complexity changes may mitigate this difference. Such complexity may be added to complexity analysis 306 when processing agent calls 322 in diagram 400.

Further in diagram 400, it may be possible to determine an optimum time for a corresponding complexity of a call. For example, agents may rush to target a fixed call time to meet performance goals, which may adversely affect complex calls and result in reduced customer satisfaction. By comparing call complexity, average call time, and customer survey results, a service provider and/or contact center may determine what the optimum call time is for a call based on its complexity. For example, complexity ranges 402 may vary depending on the needs for a specific scenario and call. In this regard, if complexity ranges 402 exist on a scale of 2-10, then a user may decide to have a single complexity rating defined in each range. However, if complexity ranges 402 are ranging from 1-30 the ranges may include a cluster of ratings (e.g., 1-5, 6-10, 11-15, etc.). Once the value for the number of ranges is defined the calls would be grouped accordingly (e.g., complexity range A, B, etc., through N for complexity ranges 402).

For the next step when determining optimum call duration for each of complexity ranges 402, the system filters the calls with high sentiment ratings 404. A high rating and/or threshold rating for this filtering may be user defined and set, and, for each range of complexity ratings, may take the calls above the high mark/threshold defined. With the new filtered dataset, average call durations 406 for each of those calls in complexity ranges 402 may be determined for the optimum call duration per complexity. An output of optimum call durations 408 are output for each level of complexity from complexity ranges 402. This calculation for optimum call durations 408 based on complexity and sentiment ratings may then be plugged into the calculation for determining training opportunities.

Figure 5:
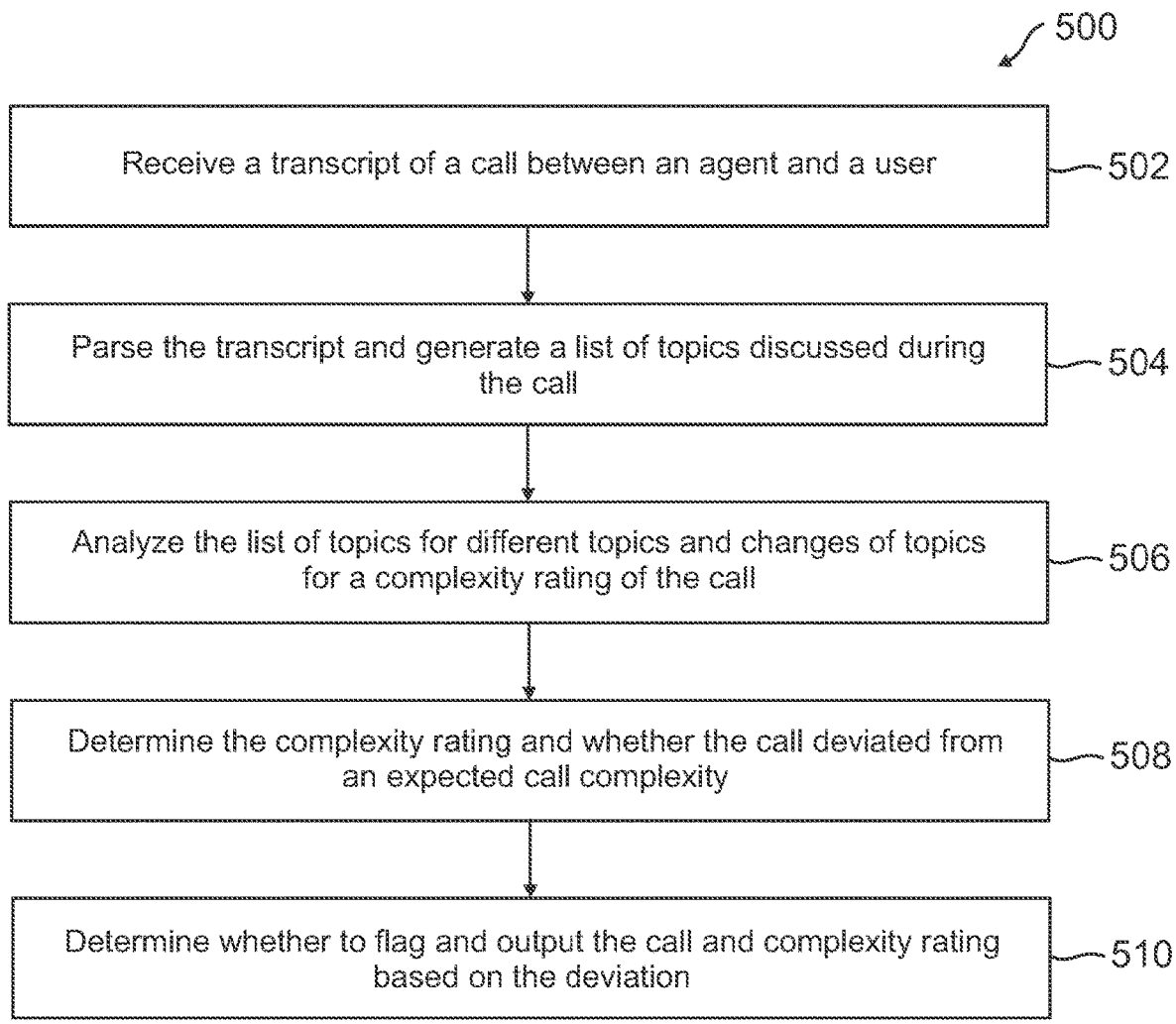
FIG. 5 is a simplified diagram of an exemplary flowchart for call complexity computation using identified topics and topic changes according to some embodiments.

FIG. 5 is a simplified diagram of an exemplary flowchart for call complexity computation using identified topics and topic changes according to some embodiments. Note that one or more steps, processes, and methods described herein of flowchart 500 may be omitted, performed in a different sequence, or combined as desired or appropriate based on the guidance provided herein. Flowchart 500 of FIG. 5 includes operations for call complexity computation and analysis system and platform, as discussed in reference to FIG. 1-4. One or more of steps 502-510 of flowchart 500 may be implemented, at least in part, in the form of executable code stored on non-transitory, tangible, machine-readable media that when run by one or more processors may cause the one or more processors to perform one or more of steps 502-510. In some embodiments, flowchart 500 can be performed by one or more computing devices discussed in environment 100 of FIG. 1.

At step 502 of flowchart 500, a transcript of a call between an agent and a user is received. A call may correspond to a communication, such as a phone call, video chat or conference, web or application-based text chat, or the like that may be performed to discuss an issue, activity, data processing request and/or action by a customer or other user with an agent of a company and/or working on behalf of the company. For example, an event that is recorded and includes voice data may correspond to a call to a contact center for assistance or the like with an underlying computing issue. In this regard, calls and other events may be captured in event data streams from phone communications, video streams, user interfaces that customers may utilize with contact centers and CRM services, and the like. Transcripts may be determined by converting any non-text data to text data, such as through a voice or speech-to-text process and application, which may generate a text-based document or file having a time-stamped and/or chronologically ordered conversation between a customer and agent. As such, transcripts may include text-based data usable to record the contents of communications between customers and agents or two or more other users.

At step 504, the transcript is parsed, and a list of topics discussed during the call is generated. Transcripts may include data that may be parsed to identify content of the transcript, and therefore include content that was discussed during the communications, such as topics of discussion. A parser may correspond to a rule-based engine, ML model, NN, or the like for intent analysis that may be configured and/or trained to identify topics in conversations from text-based data. The parser may therefore take a transcript of a voice data call or other communication and output a list of identified topics. These topics may be based on trained topics from previous data samples and/or rules for topic identification, which may be based on labels of previous topics. identified words, phrases, sentences, keywords, or the like for topics, and other data that may signify that a topic was discussed.

At step 506, the list of topics is analyzed for different topics and changes of topics for a complexity rating of the call. Once topics are identified, the list may be used to compute a call complexity as a rating that is calculated using a number of different topics discussed. The call complexity calculation may be performed by through measuring topic changes so that the rating is increased with increasing number of topic changes to "new" topics. However, revisited topics may also be considered and provided a weighted value in the calculation. Such topic and topic change identifications may require analysis of one or more users' speech or conversation, as well as when the speech or conversation changes to a new topic in the transcript and list. For example, the list may be ordered based on when the topics were brought up and/or discussed in such speech or conversation. As such, the list of topics may be chronologically ordered based on timestamps and/or order of the conversation in the transcript, which may be used to identify the order through which topics were discussed, when topics change, and/or if topics are revisited.

At step 508, the complexity rating, as well as whether that complexity rating deviates from an expected call complexity, is determined. When determining the complexity rating, a call complexity application and/or complexity evaluation engine may assign an initial score to the first topic discussed. For each topic change, an additional value may be added to the initial score based on the new topic that was discussed. If the topic was revisited, an adjusted or zero value rating may be assigned to the change and transition to the revisited topic. In this regard, a weighted coefficient may be assigned to each of the topics discussed during the call and found in the list of topics from the transcript. The weighted coefficient may correspond to different coefficients for values, scores, or other ratings based on being the first topic, a next topic from a topic change or transition, and/or a revisited topic.

At step 510, it is determined whether to flag and output the call and complexity rating based on the deviation for expected call complexity. This may include determining whether the complexity rating meets or exceeds a threshold rating for call complexity. The threshold rating may be based on an average rating and/or average rating per expected call length. In some embodiments, the average rating may be based on different call lengths, such as an average complexity rating for 5-10 minute calls, 10-15 minute calls, etc. If the call is flagged, the complexity rating may be attached to and/or output with the call in a CRM system, such as for review by an agent and/or supervisor, which may include identification of training or assistance that may be provided to improve handling of calls and/or call length for future calls. Further, a summary may be provided with the call and/or complexity rating, which may identify the list of topics, rating and/or cause of rating (e.g., the weighted coefficients and/or values assigned to discussed topics and topic changes or transitions), and the like.

As discussed above and further emphasized here, FIGS. 1, 2, 3A, 3B, 3C, 4, and 5 are merely examples of contact center system 110 and corresponding methods for call complexity computation and usage in CRM and contact center systems, which examples should not be used to unduly limit the scope of the claims. One of ordinary skill in the art would recognize many variations, alternatives, and modifications.

Figure 6:
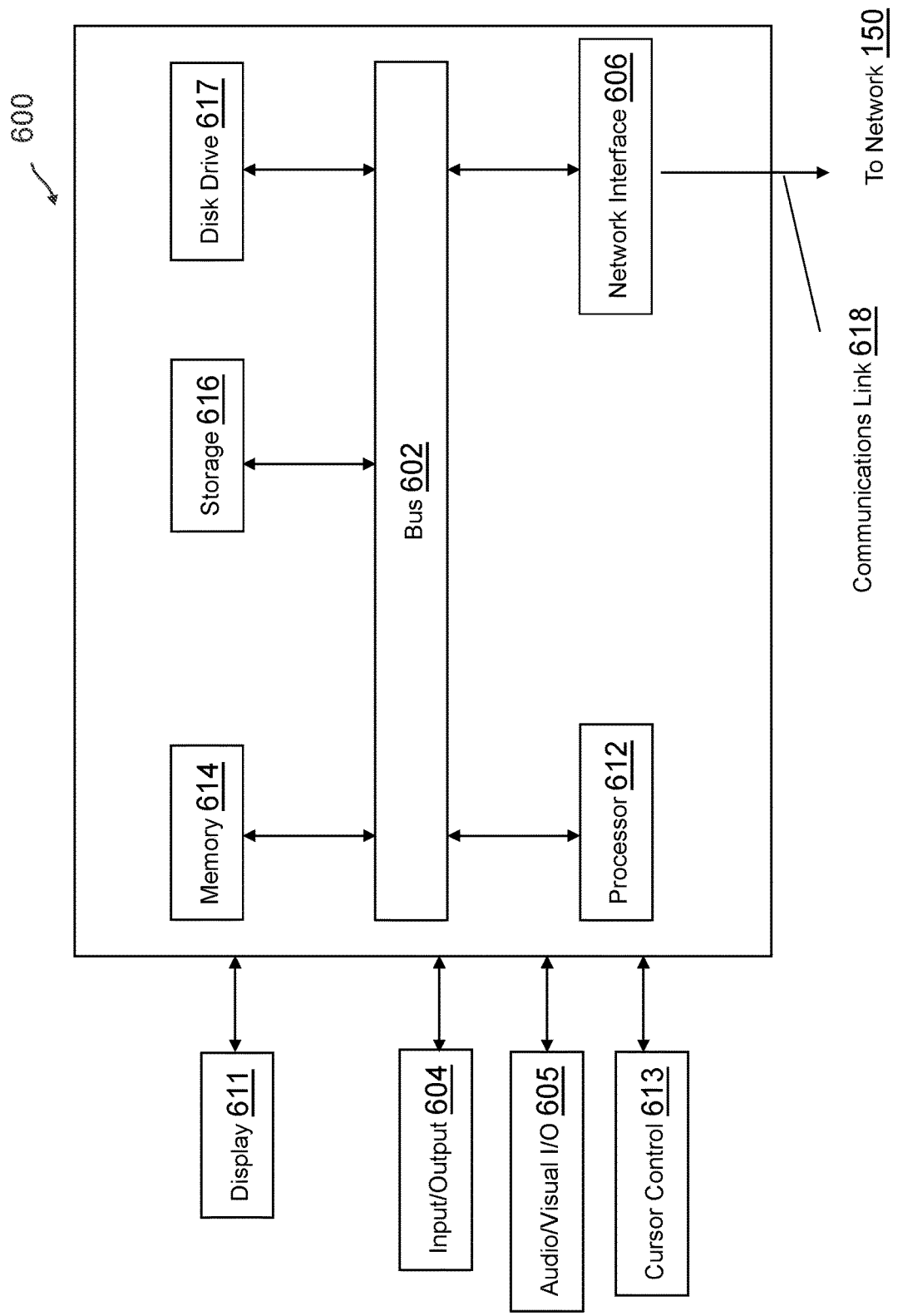
FIG. 6 is a simplified diagram of a computing device according to some embodiments.

FIG. 6 is a block diagram of a computer system 600 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio/visual input/output component 605 may also be included to allow a user to use voice for inputting information by converting audio signals. Audio/visual I/O component 605 may allow the user to hear audio, and well as input and/or output video. A transceiver or network interface 606 transmits and receives signals between computer system 600 and other devices, such as another communication device, service device, or a service provider server via network 150. In one embodiment, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. A call evaluation system configured to dynamically compute call complexity for voice data calls using topics identified from call transcripts, the call evaluation system comprising:
    a processor and a non-transitory computer readable medium operably coupled thereto, the computer readable medium comprising a plurality of instructions stored in association therewith that are accessible to, and executable by, the processor, to perform call evaluation operations which comprise:
        receiving a transcript of a voice data call between a user and an agent of a customer relationship management (CRM) system, wherein the transcript comprises text data converted from audio data of the voice data call;
        parsing the transcript for at least one topic discussed between the user and the agent during the voice data call;
        generating, based on the parsing, a list of topics for the voice data call that includes the at least one topic;
        analyzing, by a call complexity evaluation engine, the list of topics for a complexity rating of the voice data call, wherein the call complexity evaluation engine computes the complexity rating using a weighted coefficient assigned to each of the at least one topic;
        determining, based on the complexity rating and a length of the voice data call, a deviation from at least one of an expected call complexity or an expected call length;
        flagging the voice data call in the CRM system for review based on the determining; and
        outputting the flagged voice data call via an interface of the CRM system.

2. The call evaluation system of claim 1, wherein the at least one topic comprises a plurality of topics, and wherein the analyzing the list of topics comprises:
    selecting one of the plurality of topics;
    determining whether the selected one of the plurality of topics is different from a previously selected one of the plurality of topics;
    determining whether the selected one of the plurality of topics is in the list of topics with a location value less than a current location value of the selected one of the plurality of topics in the list of topics;
    scoring the selected one of the plurality of topics based on the determining whether the topic is different and whether the location value of the selected one of the plurality of topics in the list of topics is less than the current location value; and
    proceeding to a next one of the plurality of topics.

3. The call evaluation system of claim 2, wherein the scoring comprises assigning a first value to the selected one of the plurality of topics if the selected one of the plurality of topics changes a topic designation from the previously selected one of the plurality of topics or assigning a second value lower than the first value if the selected one of the plurality of topics is a matching topic to the previously selected one of the plurality of topics.

4. The call evaluation system of claim 2, wherein the scoring uses a revisited coefficient based on whether the selected one of the plurality of topics has been revisited in the list of topics.

5. The call evaluation system of claim 2, wherein before the selecting, the analyzing the list of topics further comprises:
    sorting the list of topics in an ordered list based on a timestamp of occurrence for each of the plurality of topics during the voice data call.

6. The call evaluation system of claim 1, wherein the weighted coefficient for each of the at least one topic is specific to each tenant of the CRM system based on topic complexity designation by each tenant.

7. The call evaluation system of claim 1, wherein the weighted coefficient is based on an average length of time of each of the at least one topic.

8. The call evaluation system of claim 1, wherein the call evaluation operations further comprise:

outputting, to at least one of the user or the agent, the complexity rating with a summary associated with at least one of the voice data call, the transcript, or the list of topics.

9. The call evaluation system of claim 8, wherein the call evaluation operations further comprise:
determining a recommendation based on the complexity rating and the list of topics,
wherein the recommendation is output with the complexity rating and the summary during the outputting the flagged voice data call via the interface of the CRM system.

10. A method to dynamically compute call complexity for voice data calls using topics identified from call transcripts for a call evaluation system, the method comprising:
receiving a transcript of a voice data call between a user and an agent of a customer relationship management (CRM) system, wherein the transcript comprises text data converted from audio data of the voice data call;
parsing the transcript for at least one topic discussed between the user and the agent during the voice data call;
generating, based on the parsing, a list of topics for the voice data call that includes the at least one topic;
analyzing, by a call complexity evaluation engine, the list of topics for a complexity rating of the voice data call, wherein the call complexity evaluation engine computes the complexity rating using a weighted coefficient assigned to each of the at least one topic;
determining, based on the complexity rating and a length of the voice data call, a deviation from at least one of an expected call complexity or an expected call length;
flagging the voice data call in the CRM system for review based on the determining; and
outputting the flagged voice data call via an interface of the CRM system.

11. The method of claim 10, wherein the at least one topic comprises a plurality of topics, and wherein the analyzing the list of topics comprises:
selecting one of the plurality of topics;
determining whether the selected one of the plurality of topics is different from a previously selected one of the plurality of topics;
determining whether the selected one of the plurality of topics is in the list of topics with a location value less than a current location value of the selected one of the plurality of topics in the list of topics;
scoring the selected one of the plurality of topics based on the determining whether the topic is different and whether the location value of the selected one of the plurality of topics in the list of topics is less than the current location value; and
proceeding to a next one of the plurality of topics.

12. The method of claim 11, wherein the scoring comprises assigning a first value to the selected one of the plurality of topics if the selected one of the plurality of topics changes a topic designation from the previously selected one of the plurality of topics or assigning a second value lower than the first value if the selected one of the plurality of topics is a matching topic to the previously selected one of the plurality of topics.

13. The method of claim 11, wherein the scoring uses a revisited coefficient based on whether the selected one of the plurality of topics has been revisited in the list of topics.

14. The method of claim 11, wherein before the selecting, the analyzing the list of topics further comprises:
sorting the list of topics in an ordered list based on a timestamp of occurrence for each of the plurality of topics during the voice data call.

15. The method of claim 10, wherein the weighted coefficient for each of the at least one topic is specific to each tenant of the CRM system based on topic complexity designation by each tenant.

16. The method of claim 10, wherein the weighted coefficient is based on an average length of time of each of the at least one topic.

17. The method of claim 10, further comprising:
outputting, to at least one of the user or the agent, the complexity rating with a summary associated with at least one of the voice data call, the transcript, or the list of topics.

18. The method of claim 17, further comprising:
determining a recommendation based on the complexity rating and the list of topics,
wherein the recommendation is output with the complexity rating and the summary during the outputting the flagged voice data call via the interface of the CRM system.

19. A non-transitory computer-readable medium having stored thereon computer-readable instructions executable to dynamically compute call complexity for voice data calls using topics identified from call transcripts for a call evaluation system, the computer-readable instructions executable to perform call evaluation operations which comprises:
receiving a transcript of a voice data call between a user and an agent of a customer relationship management (CRM) system, wherein the transcript comprises text data converted from audio data of the voice data call;
parsing the transcript for at least one topic discussed between the user and the agent during the voice data call;
generating, based on the parsing, a list of topics for the voice data call that includes the at least one topic;
analyzing, by a call complexity evaluation engine, the list of topics for a complexity rating of the voice data call, wherein the call complexity evaluation engine computes the complexity rating using a weighted coefficient assigned to each of the at least one topic;
determining, based on the complexity rating and a length of the voice data call, a deviation from at least one of an expected call complexity or an expected call length;
flagging the voice data call in the CRM system for review based on the determining; and
outputting the flagged voice data call via an interface of the CRM system.

20. The non-transitory computer-readable medium of claim 19, wherein the at least one topic comprises a plurality of topics, and wherein the analyzing the list of topics comprises:
selecting one of the plurality of topics;
determining whether the selected one of the plurality of topics is different from a previously selected one of the plurality of topics;
determining whether the selected one of the plurality of topics is in the list of topics with a location value less than a current location value of the selected one of the plurality of topics in the list of topics;
scoring the selected one of the plurality of topics based on the determining whether the topic is different and whether the location value of the selected one of the plurality of topics in the list of topics is less than the current location value; and proceeding to a next one of the plurality of topics.

* * * * *